United States Patent [19]
Pelenc et al.

[11] 3,890,607
[45] June 17, 1975

[54] ELECTROMAGNETIC POSITION INDICATOR

[75] Inventors: Yves Pelenc, Tronche; Jean Ambier, Grenoble; Roger Lavergne, Poisat, all of France

[73] Assignee: Merlin Gerin, Grenoble, France

[22] Filed: Jan. 17, 1973

[21] Appl. No.: 324,402

[30] Foreign Application Priority Data
Jan. 24, 1972 France .............................. 72.02293
Apr. 25, 1972 France .............................. 72.15576

[52] U.S. Cl. ................ 340/199; 176/19 R; 340/179
[51] Int. Cl. ............................................ G08c 19/08
[58] Field of Search ................ 340/199, 196, 188 R

[56] References Cited
UNITED STATES PATENTS
2,911,632  11/1959  Levine .............................. 340/196
3,488,578  1/1970  Stigmark .......................... 340/199
3,555,405  1/1971  Martin .............................. 340/199
3,750,122  7/1973  Maeda .............................. 340/196

*Primary Examiner*—Thomas B. Habecker
*Attorney, Agent, or Firm*—Stevens, Davis, Miller & Mosher

[57] ABSTRACT

An electromagnetic position indicator to continuously indicate the position of a linearly movable mobile, such as a nuclear reactor control rod, operatively connected to magnetic core means which vary the inductive coupling between primary and secondary windings. One of the windings, preferably the secondary winding comprises pairs of oppositely connected coils spaced apart in the direction of movement of the core means to improve the measurement precision. Analog or digital means may be provided to process the output signal.

7 Claims, 17 Drawing Figures

DIFFERENTIAL COIL PAIR

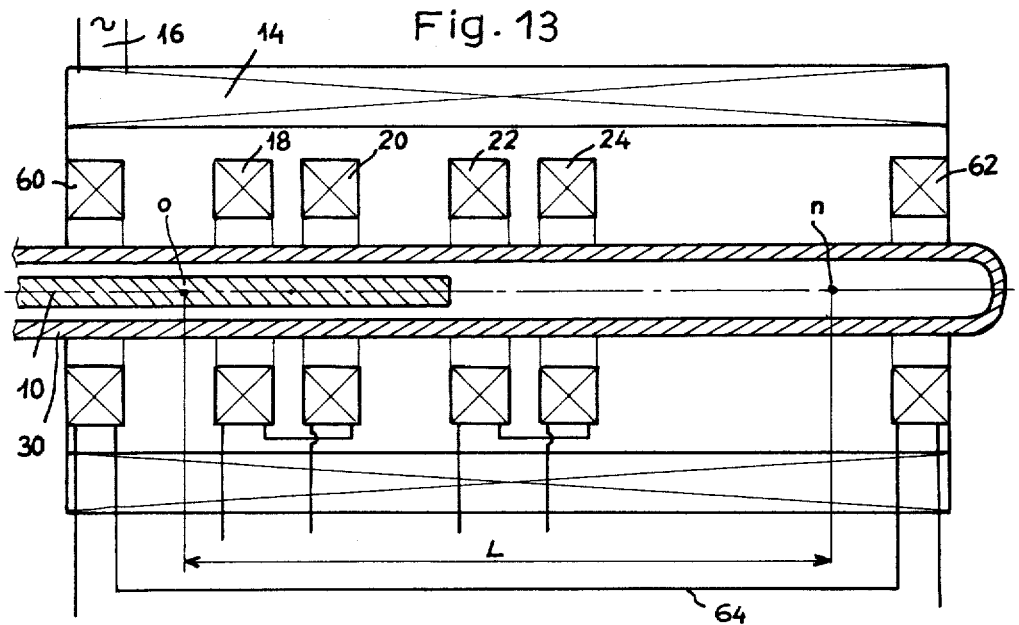
Fig. 13
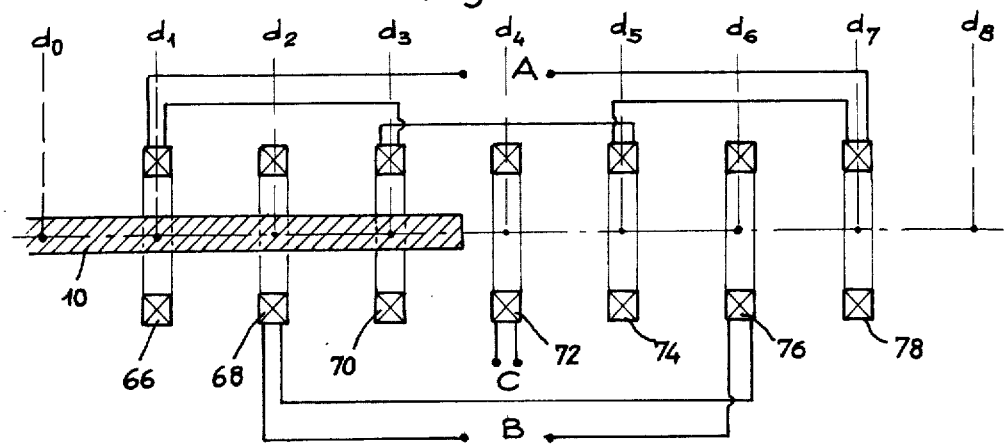
Fig. 14
Fig. 17
| n \ Bits | C | B | A |
|---|---|---|---|
| 0 | 0 | 0 | 0 |
| 1 | 0 | 0 | 1 |
| 2 | 0 | 1 | 1 |
| 3 | 0 | 1 | 0 |
| 4 | 1 | 1 | 0 |
| 5 | 1 | 1 | 1 |
| 6 | 1 | 0 | 1 |
| 7 | 1 | 0 | 0 |

ELECTROMAGNETIC POSITION INDICATOR

This invention relates to an electromagnetic position indicator and more particularly to an indicator continuously indicating the position of a linearly movable mobile operatively connected to magnetic core means which vary the degree of inductive coupling between primary and secondary windings delivering an output signal responsive to the position of the mobile.

Indicators of this kind are well known and extensively used in various applications, more particularly in cases where the mobile is disposed in a closed vessel in which mechanical and electrical equipment cannot be introduced because of the enivronmental conditions, such as high temperatures, chemical corrosion, or because of tightness considerations. Static electromagnetic indicators are widely used to detect the position of control rods in nuclear reactors and have the supplementary advantage of a complete absence of wear.

The known transformers of this kind, in which the position of the magnetic core determines the mutual inductance between the primary and secondary windings to deliver at the terminals of the secondary winding an output signal that varies with the position of the core have several drawbacks:

when the magnetic core is completely withdrawn from the measuring zone, the secondary winding continues to deliver a non-zero induced output signal;

the measurement of the variation of the induced output voltage due to the penetration of the core into the measuring zone involves the differentiation of two only slightly different voltages;

the measurement precision is relatively small;

the primary winding is fed at constant voltage so that the induced voltage in the secondary winding varies with the temperature;

the measurement accuracy is influenced by the presence of magnetic stray fields;

the output signal varies non linearly with the position of the core.

It is an object of the invention to provide an improved electromagnetic position indicator of great precision having a simple and reliable structure.

It is another object of the invention to provide an indicator which is not sensitive to temperature.

It is a further object of the invention to provide an indicator providing an output signal that is independent of magnetic leakage fields.

Still a further object of the invention is to provide an indicator delivering an output signal that varies linearly with the position to be indicated.

Another object of the invention is to provide an indicator adapted to provide a substantially zero output signal when the magnetic core member is withdrawn from the measuring zone.

Still another object of the invention is to provide analog or digital indicator output signal processing devices.

These and other objects and advantages will become apparent upon reading of the following description of some embodiments of the invention shown in the annexed drawings, in which:

FIG. 5 corresponds to FIG. 4 but shows the diagram for secondary coils having a like number of turns;

FIG. 6 shows a block schematic representation of a supply current control device for the primary winding;

FIG. 7 is a block schematic representation of an electronic device processing the output signals of different pairs of secondary coils;

Figure 1:
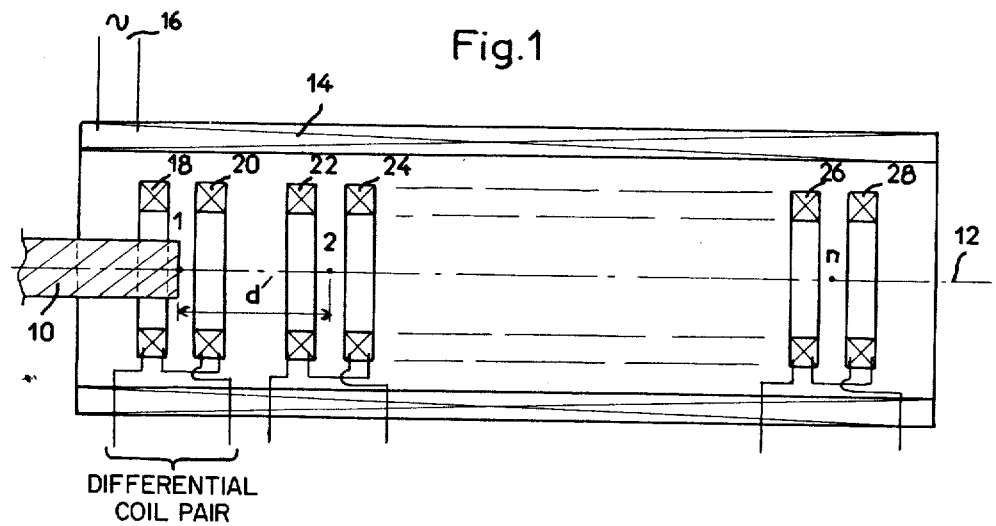
FIG. 1 is a schematic representation viewed in axial cross section of an indicator according to the invention which has a single primary winding and a plurality of paired secondary winding coils coupled in opposition.
Figure 7:
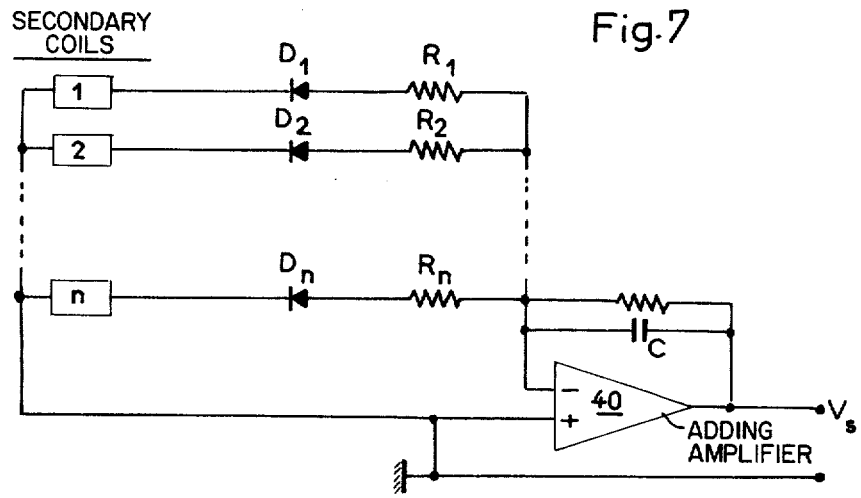
Figure 8:
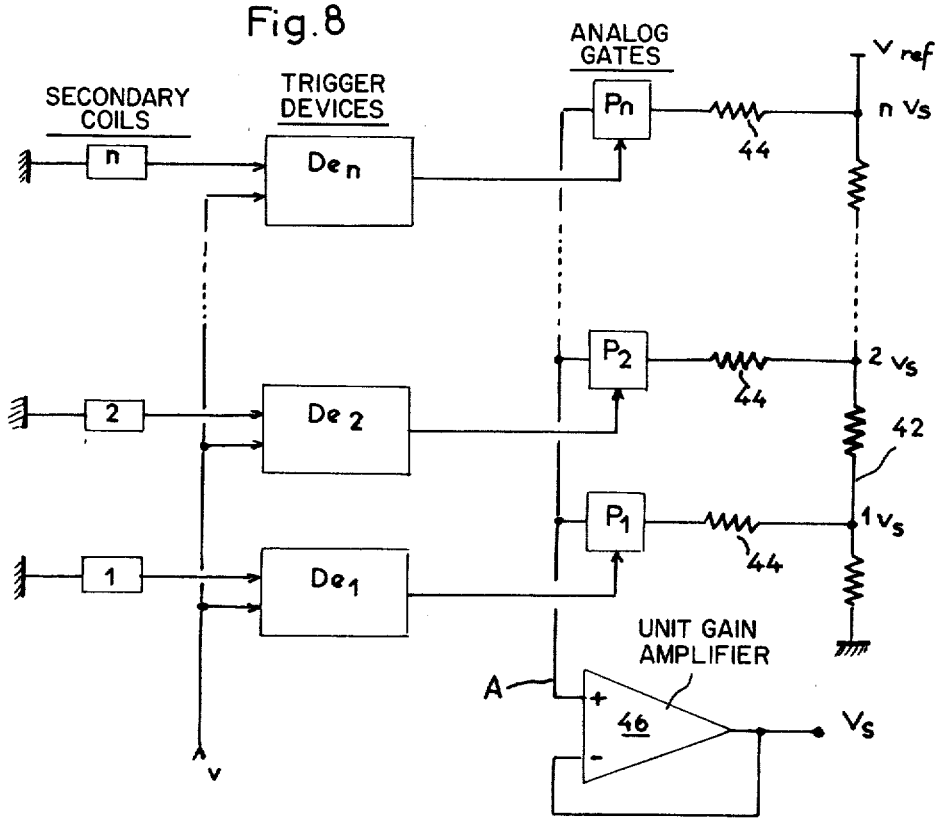
Figure 9:
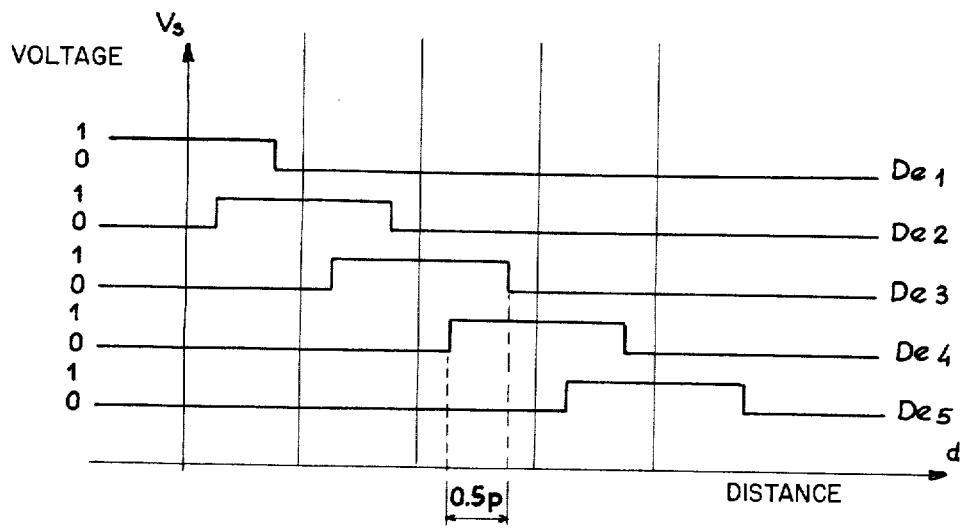
Figure 10:
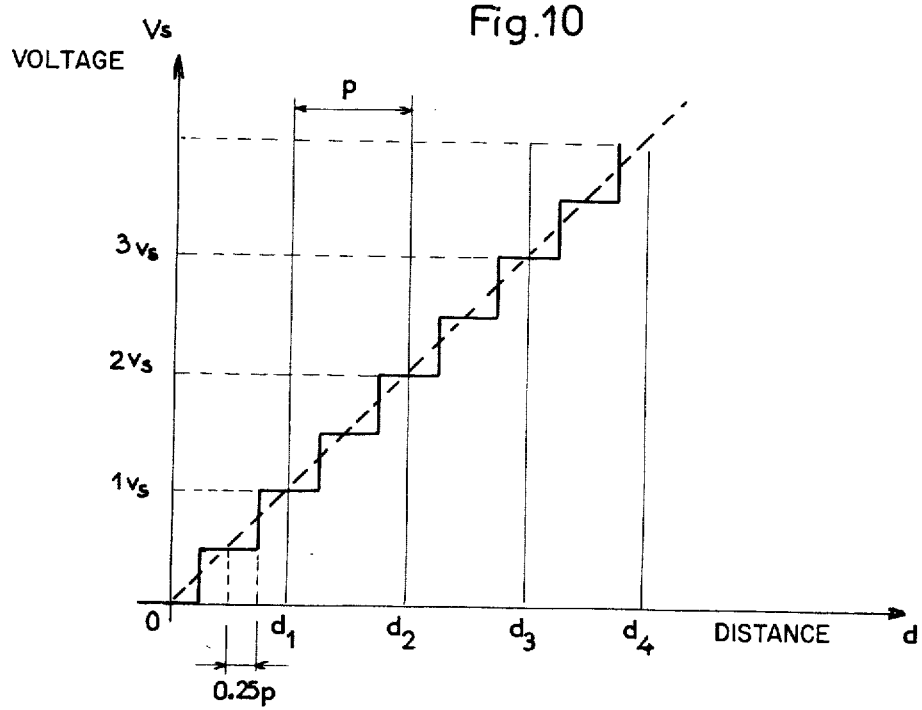
Figure 11:
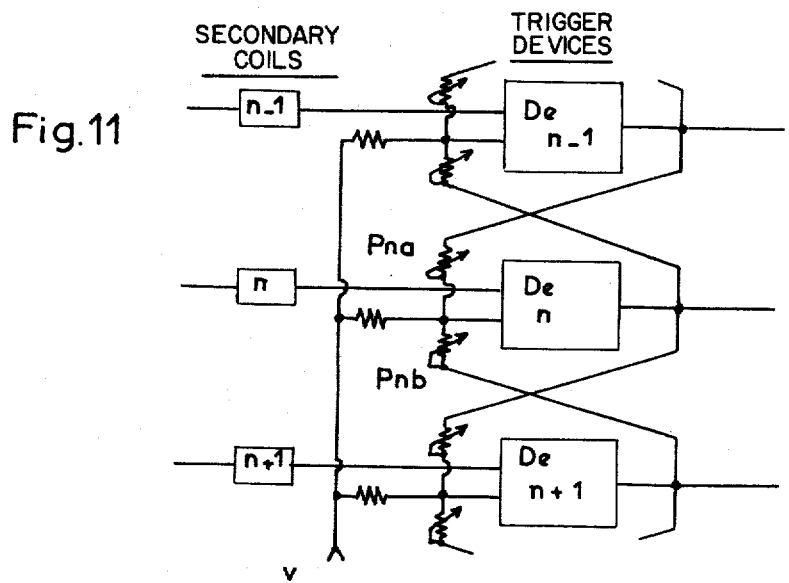
Figure 12:
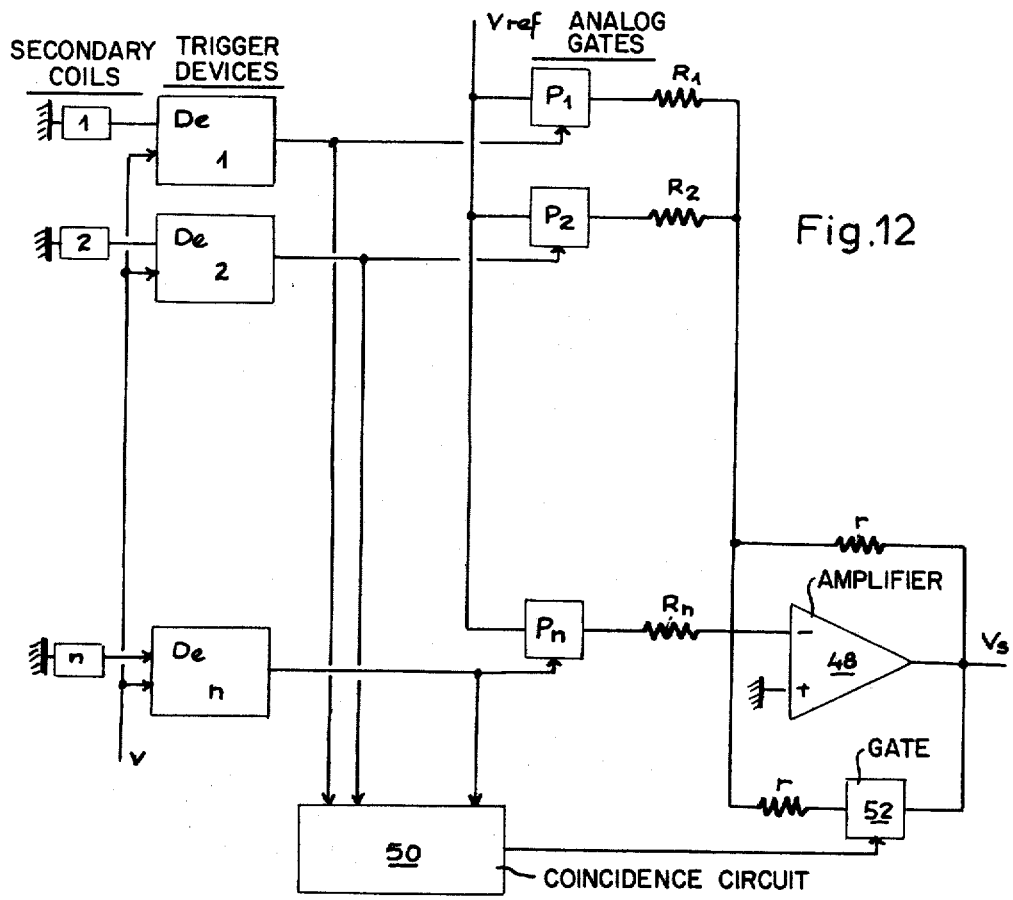
Figure 15:
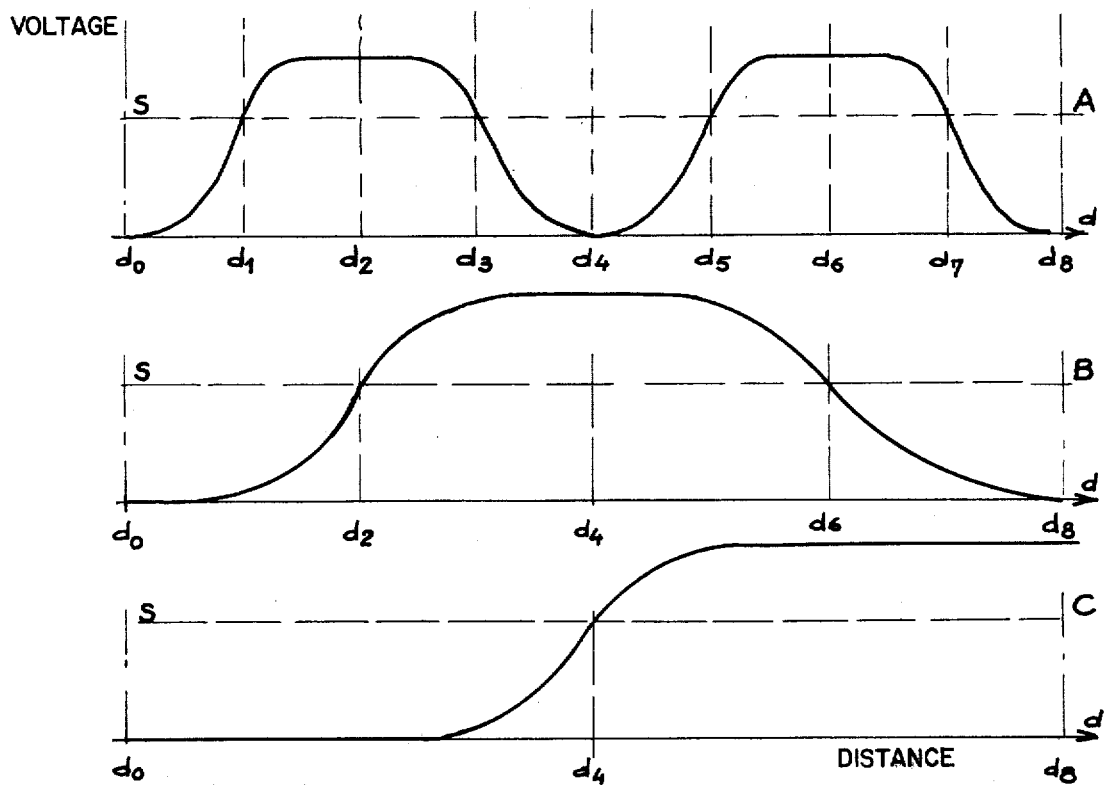
Figure 16:
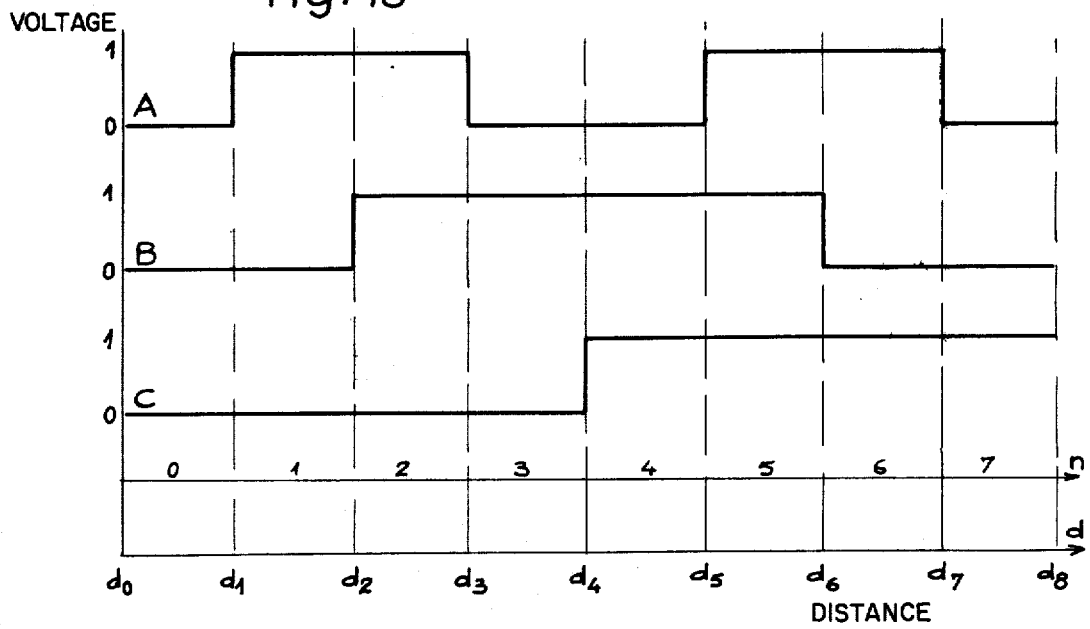

FIG. 8 corresponds to FIG. 7 but shows another embodiment of the data processing device;

FIG. 9 shows the state of the different threshold triggering devices of FIG. 8 as a function of the position of the core member;

FIG. 10 shows the voltage output signal provided by the electronic data handling device of FIG. 8 as a function of the position of the core member;

FIG. 11 shows a block schematic representation of a threshold control device for use with the FIG. 8 device;

FIG. 12 shows another embodiment of the data processing device;

FIG. 13 is a schematic representation viewed as in FIG. 1 but showing an auxiliary pair of coils;

FIG. 14 shows the connection of the secondary coils providing coded digital output signals;

FIG. 15 shows the response curves of the output signals delivered by the coil groups of FIG. 14;

FIG. 16 shows the binary output signals obtained from the FIG. 15 signals; and

FIG. 17 illustrates a code used in the FIG. 14 device.

In the following description and claims the term "differential" or "connected in opposition" used in connection with a pair of juxtaposed coils is intended to designate coils which are electrically connected in series and have a winding sense such that the magnetic fields produced by the current flowing in the two coils are in opposite directions (substractive magnetic effects) while the term "cumulatively connected" refers to coils producing fields in the same direction (additive magnetic effects). In the drawings all the coils have the same winding sense and the substractive or additive effect is obtained by the appropriate interconnection of the terminals of the coils, as shown, but it is apparent that the same result can be obtained by varying the winding senses without inverting the terminal connections.

In the FIGURES, like or analogic elements are denoted by the same reference numbers carrying prime marks as the case may be.

Figure 2:
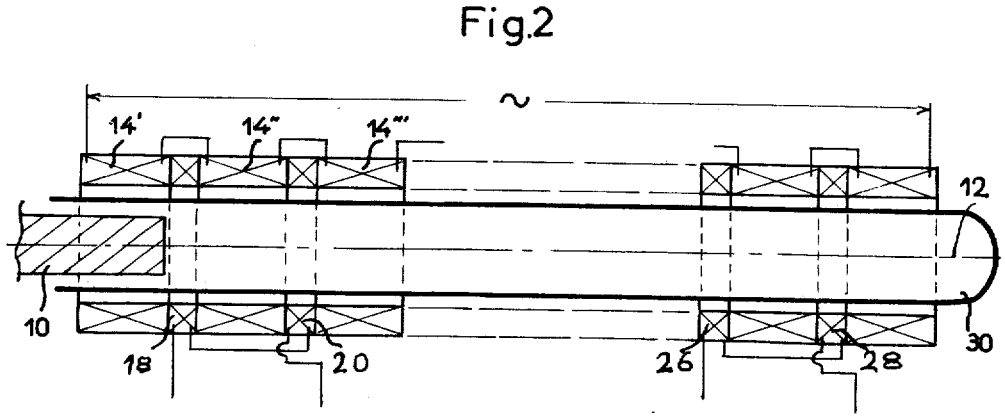
FIG. 2 shows another embodiment in which the primary winding is subdivided into a plurality of cumulatively series connected coils inserted between coils of the secondary winding connected in opposition.
Figure 3:
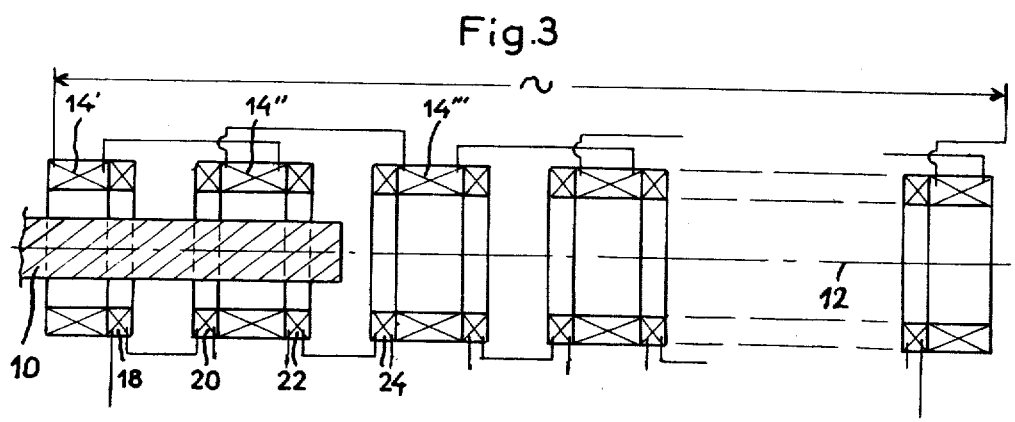
FIG. 3 is a schematic representation of a third embodiment having a plurality of largely spaced apart primary winding coils connected in opposition between pairs of cumulatively connected secondary winding coils.

Referring now to FIGS. 1 to 3, there are shown electromagnetic position indicators having a movable core member 10 of magnetic material which may be connected to a control rod of a nuclear reactor and which is adapted to move linearly along its axis 12. In FIG. 1, the primary winding is constituted by a single cylindrical elongated coil 14 having the axis 12 and the terminals of which are connected at 16 to a source of alternating current (not shown) producing a magnetic flux of constant amplitude inside coil 14. Within coil 14 are disposed coaxially a plurality of pairs of secondary differential coils 18, 20; 22, 24; . . . .; 26, 28, which are regularly spaced apart along the axis 12 along which the core member 10 moves. The coils of each of the successive pairs 1, 2, . . . . $n$ are electrically connected in opposition so as to deliver a differential signal when the primary winding 14 is alternating current energized. The head end of the core member 10 moving along the path 12 penetrates into and withdraws from the coils 18 to 28 and modifies thus the mutual inductance between each coil and the inductively coupled primary winding so as to produce output signals at the terminals of the pairs of coils 1 to $n$ as a function of the position of the core member 10. The two coils of each pair of secondary coils are of identical structure and configuration and have the same number of turns so that a balanced substantially zero signal is provided at the terminals of the pair when the inductive coupling between each coil of the pair and the primary winding is the same, that is when the core member 10 is either completely withdrawn from the coils of the pair or completely inserted into the coils. The output signal of each pair has a bell-shaped form as a function of the position of the core member 10 and the peaks of the different bell-shaped curves are spaced apart a distance $d'$ from the neighboring ones corresponding to the "pitch" $p$ of the coils of the secondary winding.

Figure 5:
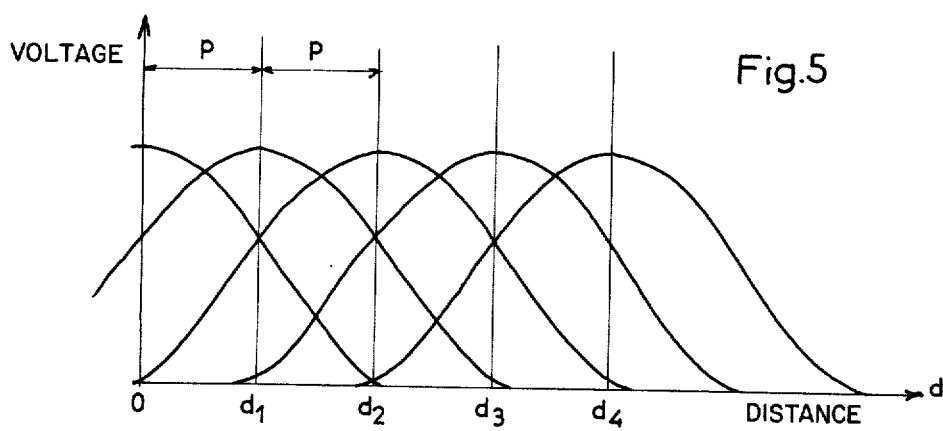

All secondary winding coils 18 to 28 may have the same number of turns so that the peak values of the output voltage at the terminals of all the pairs are equal as shown in FIG. 5, representing the value of the output voltage as a function of the position d of the core member 10 for 5 successive pairs of coils, the points $o$, $d_1$, $d_2$, $d_3$, $d_4$ corresponding to the center of successive pairs of coils.

Figure 4:
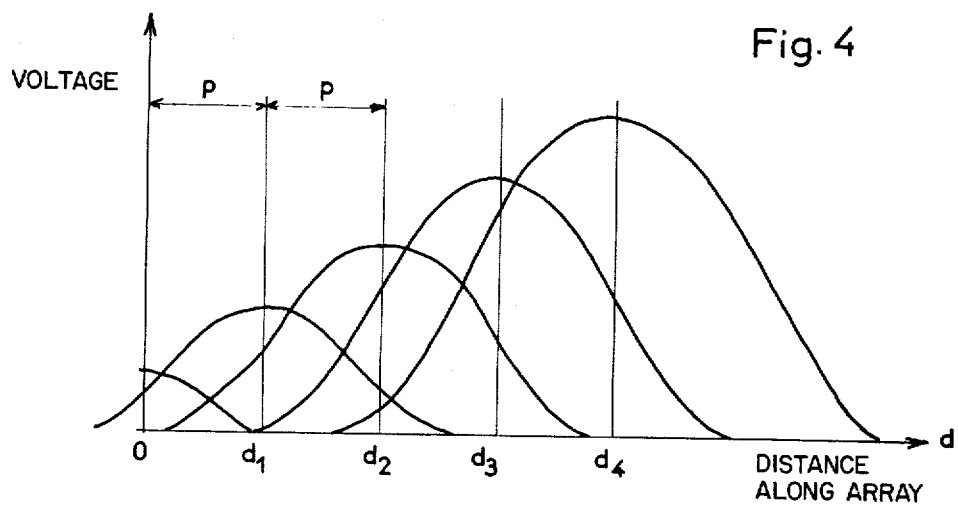
FIG. 4 is a diagram of the output signals provided by pairs of secondary coils, the number of turns of the pairs increasing from left to right.

In the embodiment shown in FIG. 4 the number of turns of successive pairs of coils increases proportionally to the rank number of the pairs, the coils of the first pair of coils having $s$ turns, the second $2s$ and so on, the coils of the $n^{th}$ pair of coils having each ns turns. The peak value of the bell-shaped output voltage of successive pairs increases then correspondingly, as shown in FIG. 4.

In the embodiment shown in FIG. 2, the primary winding comprises a plurality of cumulatively series connected coils 14', 14'', 14''', etc., whereby the coils 18 to 28 are inserted between pairs of successive primary coils, respectively, and electrically connected in series and in opposition as in FIG. 1, so as to constitute a kind of compound cylindrical winding. Of course, the operation of the embodiments of FIGS. 1 and 2 is substantially identical. A sleeve or sheath 30 shown on FIG. 2 separates the core member from the windings as in the case of a nuclear reactor where the inside of the sleeve may communicate with the high temperature zone of the reactor.

FIG. 3 represents another embodiment in which the coils 14', 14'', 14''', etc., of the primary winding are pairwise connected in opposition, each primary coil being sandwiched between a pair of secondary coils. The sandwiched coils are spaced apart to permit the return of the magnetic flux and pairs of secondary coils separated by a gap are connected series in opposition as in the FIG. 1 embodiment.

Figure 6:
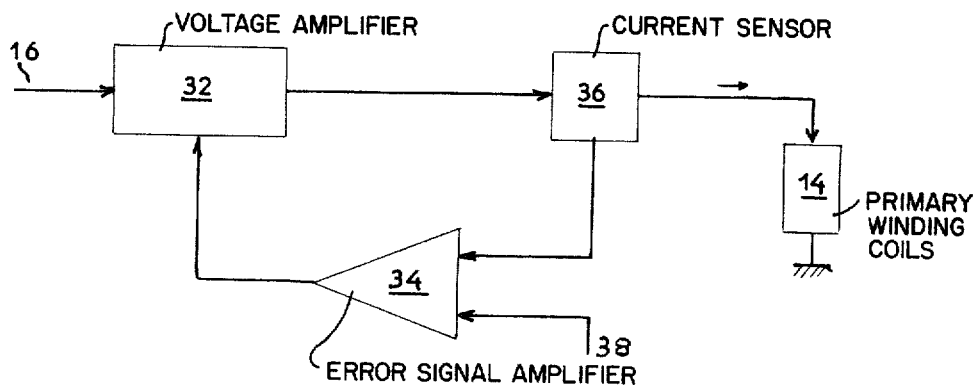

Preferably a supply current control device feeds the primary winding 14 as illustrated in FIG. 6. The supply current is maintained at a constant value independently of the ambient temperature conditions in order to produce an inducing magnetic field of constant value. A variable-gain voltage amplifier 32 is driven by an error signal amplifier 34 which compares continuously the output signal of a current sensing device 36 with a set value 38. In order to compensate for distorsions of the wave shape of the signals it is preferable to maintain constant the very parameter that is detected by the secondary signal handling system. If the latter measures the R.M.S. value; the mean value after rectifying; the peak value; etc.; of the signals provided by the secondary coils the current control devices maintains constant the R.M.S.; mean or peak value; etc.; of the primary current by sensing of the corresponding value at 36.

The processing of the output signals of the different electromagnetic position indicators described hereinabove may call for different analog or digital data handling devices some of which will now be described in some detail.

In a first embodiment which may be applied to the device having secondary coils of progressively increasing numbers of turns delivering output signals as illustrated in FIG. 4, the terminals of the pairs 1, 2, . . . . $n$, of secondary coils are electrically connected in series so as to sum the alternating voltages appearing at all the pairs of coils. The total voltage is then proportional to the distance covered by the core member and may be handled by a unit gain amplifier mounted as an impedance step down device which delivers an alternating voltage proportional to the distance covered by the core member (or the mobile connected thereto).

Referring to FIG. 7 now, there is shown a system in which the output signals delivered by the pairs of secondary coils 1 to n are individually rectified by a corresponding number of rectifiers (diodes) $D_1$, $D_2$, . . . ., $D_n$, respectively, before being applied to n resistors $R_1$, $R_2$, . . ., $R_n$, respectively, connected to the input terminals of an adding amplifier 40. The output voltage $V_S$ provided by the amplifier is filtered by a condensor C so as to produce a d-c signal the amplitude of which is proportional to the sum of the mean currents flowing through the diodes $D_1$ to $D_n$. In case the secondary coils have a growing number of turns delivering output signals as illustrated in FIG. 4, all the resistors $R_1$ to $R_n$ may be of identical ohmic value, the voltage $V_s$ being then proportional to the distance covered by the core member 10. In case the secondary coils deliver identically shaped output signals as shown in FIG. 5 the proportionality may be obtained by adopting the values $R_1$, $R_1/2$ . . . $R_1/n$ for the resistances $R_1$ to $R_n$, respectively. The signal $V_s$, which is proportional to the sum of the currents flowing through the diodes $D_1$ to $D_n$, respectively, is then again proportional to the distance d covered by the mobile 10 from its starting point. The diodes $D_1$ to $D_n$ have a threshold voltage which permits removal from the signal $V_s$ small rest currents flowing through the secondary coils thereby increasing the accuracy of the measurement. Of course, diodes $D_1$ to $D_n$ may be replaced by other components or circuits having more stable or controllable threshold values.

FIG. 8 illustrates a logic signal processing circuit. The output signals issued by the pairs of coils 1 to n are applied to discriminating trigger devices $De_1$, $De_2$, . . . .

$De_n$, respectively, which compare the input signal with a threshold value and deliver a continuous logic level 0 or logic level 1 signal according to whether the amplitude of the output signal of the pairs of secondary coils is less than or higher than the threshold value. Each trigger device $De_1$ to $De_n$ drives an analog gate $P_1$ to $P_n$, respectively, which connects in open state a point A to a predetermined point of a voltage divider 42. The connection points to the voltage divider 42 are selected in such a manner that the point A is at potential $v_x$ when gate $P_1$ is open; at potential $2v_x$ when gate $P_2$ is open . . . ., and at potential $nv_x$ when gate $P_n$ is open. Resistors 44 are preferably connected in series with each gate $P_1$, $P_2$, . . ., $P_n$, as shown, so as to bring point A at an intermediary potential when two adjacent gates are simultaneously opened, the value of this potential being the mean value of the potentials associated with the corresponding gates. The simultaneous opening of two gates corresponds to the overlapping of the logic signals of two trigger devices, and this overlapping may preferably correspond to a half a pitch path gone through by the core member 10 as illustrated in FIG. 9 showing the logic signals of the different trigger devices as a function of the distance covered by (the head end of) the core member 10 from a starting point. The graded curve of FIG. 10 illustrating the variation of the potential $V_s$ of point A as a function of the distance $d$, shows that the half a pitch overlapping of the signals introduces an intermediary step in the graded curve so that the measurement precision with respect to the theoretical straight line is brought to plus or minus 0.25 p. A unit gain amplifier 46 permits transmission of the potential of point A at a low impedance level.

The overlapping of the logic signals of the different trigger devices is established by a proper selection of the ON and OFF thresholds of the trigger devices.

FIG. 11 as applied to the FIG. 8 device illustrates how the threshold ON and OFF values of a trigger device $De_n$ may be monitored. To this end, the threshold value applied to trigger device $De_n$ is corrected by connecting the input of the device $De_n$ receiving the threshold voltage to the output of the next lower and of the next higher devices $De_{n-1}$ and $De_{n+1}$, respectively, through respective potentiometers $P_{na}$ and $P_{nb}$. The ON-threshold value of trigger device $De_n$ is set by the potentiometer $P_{na}$ which introduces a correction of the threshold voltage when the next lower trigger device $De_{n-1}$ is operated whereas the OFF-threshold value is set by the potentiometer $P_{nb}$ which introduces a correction of the threshold voltage when the next higher trigger device $De_{n+1}$ is actuated. The potentiometers $P_{na}$ and $P_{nb}$ permit precise regulation of the overlapping of the logic gate opening signals actuating gates $P_1$ to $P_n$.

FIG. 12 represents the block diagram of a data processing system using an amplifier 48 connected as a current summing device (adder). Such as in FIG. 8 the analog gates $P_1$, $P_2$, . . . , $P_n$ are actuated by the trigger devices $De_1$, $De_2$, . . ., $De_n$, respectively, comparing the output signals of the pairs of secondary coils 1, 2, . . . , n, respectively, with a threshold voltage V. In series with each gate $P_1$ to $P_n$ is connected a resistor $R_1$ to $R_n$, respectively, having a resistance such that the current flowing through the open gate is equal to $i_1$, $2i_1$, . . . , $ni_1$, respectively. The amplifier 48 sums the currents flowing through the open gates and delivers a signal $V_s$ which is proportional to the distance covered by the core member 10. As described with reference to FIG. 8, the measuring precision may be increased by providing an overlapping of the logic signals controlling the opening of the gates $P_1$ to $P_n$. A coincidence circuit 50 actuated by the logic signals coming from the trigger devices $De_1$ to $De_n$ detects the simultaneous opening of two successive gates and causes in this case the opening of a gate 52 connecting a resistor $r$ which divides the gain of amplifier 48 by a factor 2. The signal $V_s$ adopts then a value corresponding to the mean value of the currents flowing through the two adjacent open gates. The circuit described with reference to FIG. 12 obtains much the same result as the circuit shown in FIG. 10.

The trigger circuits may comprise any appropriate combination of known components such as a two level (saturating) integrated circuit operational amplifier followed by a diode and a filter which delivers a non zero direct voltage as soon as the amplifier starts to switch at the frequency of the alternating current input signal. The analog gates may comprise electromagnetic relays but also switching transistors or field effect transistors. The coincidence circuit 50 may comprise an adding amplifier connected to a trigger device which is actuated if and only if two or more of the trigger devices $De_1$ to $De_n$ are actuated.

The coils of successive pairs of secondary coils may have the same number of turns or increasing numbers of turns. It is of course also possible to provide a plurality of identical groups of coils having each pairs of coils with increasing numbers of turns. The coils may adopt any suitable construction. They may engage each other in interfitting relation and they may also be constituted by printed-circuit wiring.

Referring to FIG. 13, there is shown a system as described with reference to FIG. 1 but which comprises a supplemental pair of auxiliary secondary or monitoring coils 60 and 62 which are connected in series by a conductor 64. The coils 60, 62 are disposed at the extreme left and right ends of the primary winding 14 and are preferably of identical construction as the secondary coils 18, 20, . . . , etc., so that they have substantial the same inductive relation to the primary winding as the secondary coils. The coils 60 and 62 are disposed well outside the measuring range of length L extending between points o and n in such a manner that the coil 60 is always entirely traversed by the core member 10 and the coil 62 never so that the value of the voltages induced in coils 60 and 62 is not influenced by the position of the core member 10. The voltage at the output terminals of the pair of coils 60, 62 is connected to a control device (not shown) which controls the current supplied to the primary winding 14 to maintain this current at a constant value.

In operation, any variation of the magnetic field produced by the primary winding 14 and which would affect the secondary coils 18, 20, etc., produces a corresponding variation of the voltage induced in coils 60, 62. The control device (not shown) actuated by this induced voltage modifies the supply current of the primary winding 14 in such a manner as to cancel the initial variation of the magnetic field substantially. In this manner, the effect of variable losses resulting from induced currents in metal parts in the measuring zone, such as in the core member 10 or the sleeve 30, as a function of temperature are eliminated. The variation of the ohmic resistance of the winding 14 is also compensated whereas the useful signal induced in the secondary coils is not changed. Preferably, the secondary coils are connected to components having a high input impedance so that the output signals are not affected by the variation of the resistance of the secondary coils. The coils 60, 62 permit compensating for the disturbance effects affecting the entire indicator and which may be of varying value at different points of the indicator, more especially if the latter has a relatively great length. The measuring precision is thus greatly improved.

FIGS. 14 to 17 illustrate the structure and operation of a digital output signal handling device. Seven secondary coils 66, 68, 70, 72, 74, 76 and 78 are regularly spaced apart along the path of the moving element 10, at points $d_1, d_2, d_3, d_4, d_5, d_6$ and $d_7$, respectively, the limits of the path of the core member 10 being designated by the reference signs $d_o$ and $d_H$. The primary winding and the auxiliary coils which may also be present are not shown in FIG. 14. All coils 66 to 78 are of identical construction and interconnected to constitute three groups A, B and C. Group A comprises the pair of coils 66 and 70 connected in opposition and the pair of coils 74 and 78 also connected in opposition, the two pairs being connected in series, as shown. Group B comprises the coils 68 and 76, again connected in opposition and group C comprises the single coil 72.

FIG. 15 illustrates the curves of the output signals at the terminals of the three groups as a function of the position $d$ of the core member. The output signal of group A between the points $d_o$ and $d_4$ is produced by the coils 66, 70 and between the points $d_4$ and $d_8$ by the coils 74, 78. The output signals of the groups A, B and C are shaped by a suitable electronic device (not shown) such as a threshold trigger device having a threshold value S shown in FIG. 15 by dashed horizontal lines to deliver logic binary signals as shown in FIG. 16. It is apparent that the switching of one of the bits A, B and C from one logic level to the other occurs at points $d_1, d_2, d_3, d_4, d_5, d_6, d_7$ and $d_H$.

It will be seen that the signals or bits A, B and C shown in FIG. 16 correspond to a three-bit, eight-value Gray code shown in FIG. 17. This code has the characteristic that only one bit changes state from one position to the next which provides a position encoder in which the maximum reading error during the transition from one incremental position to the next is the adjacent numeral. It will be clear that the position of complete withdrawal of the core member 10 from the secondary coils 66 to 78 corresponds to the position $d_o$ and is displayed by the bits 000 of the code shown in FIG. 17. During the penetration of the core member into the coils from position $d_o$ to position $d_H$, the code adopts successively the numerals 0 to 7 as shown in FIG. 17 by the different combinations of the three bits. The three-bit code needs 4 wires for the transmssion: one wire for each bit and a common wire.

It is of course possible to provide a code having a different number of bits and consequently a different number of secondary coils.

In cases in which a bit, such as bit A in the hereinbefore described embodiment, is produced by a relatively high number of pairs of coils, such as 66, 70; 74, 78, the successive pairs are preferably series connected with phase inversion, as shown in FIG. 14, between each two interconnected pairs so as to avoid adding of non-zero residual signals.

It is apparent that a digital output signal processing system increases the reliability and accuracy of the position indicator.

What is claimed is:

1. An electromagnetic position indicator comprising:
   a. inductively coupled primary and secondary winding means extending along a linear path, said secondary winding means comprising a plurality of pairs of series-connected differential coils spaced along said path,
   b. an elongated magnetic core having a head end movable along said path, the number of coils linked with said core varying with the position of said core,
   c. means for coupling an alternating current source to said primary winding, the application of said alternating current source to said primary winding subjecting the pairs of differential coils having a coil disposed in the immediate proximity of the head end of said core to magnetic imbalance and producing at the terminals thereof a net non-zero output signal, the remaining pairs of coils being magnetically balanced to produce at the terminals thereof a substantially zero output signal, and
   d. circuit means connected to the terminals of all pairs of said coils to deliver a signal representative of the position of said core.

2. A position indicator according to claim 1 wherein said secondary winding means comprises a plurality of coils which are series-connected in a plurality of groups corresponding to the number of bits of a binary code, said groups delivering at the terminals thereof net output signals for conversion into binary signals, said signals indicating the position of said core.

3. A position indicator according to claim 1, said circuit means comprising logic circuit means converting said differential output signals into binary signals.

4. A position indicator according to claim 3, said logic circuit means comprising discriminating circuit means actuating an electronic gate means.

5. A position indicator according to claim 4, the output terminals of said electronic gate means being connected to respective points of a voltage divider delivering an output signal varying steadily with the distance covered by said core.

6. A position indicator according to claim 5, each of said pairs of secondary coils being connected to a discriminating trigger circuit actuating an electronic gate, the different electronic gates being connected to sequential points of a voltage divider.

7. A position indicator according to claim 6, the threshold values of said discriminating trigger circuits being set in such a manner that at most two adjacent gates are opened at a time.

* * * * *